United States Patent [19]

Young

[11] 4,038,434
[45] July 26, 1977

[54] ANTIOXIDANT STABILIZED EDIBLE COMPOSITIONS

[75] Inventor: David W. Young, Homewood, Ill.

[73] Assignee: Howard Hall & Company, Cos Cob, Conn.

[21] Appl. No.: 666,438

[22] Filed: Mar. 12, 1976

[51] Int. Cl.$^2$ ................................................ A23L 3/34
[52] U.S. Cl. .................................. 426/544; 260/398.5; 260/413; 260/486 R; 426/555; 426/556
[58] Field of Search ............... 426/541, 544, 555, 556; 260/562, 401, 486 R, 632.5, 398.5, 413

[56] References Cited

U.S. PATENT DOCUMENTS

| | | | |
|---|---|---|---|
| 2,654,722 | 10/1953 | Young et al. | 260/562 |
| 3,492,349 | 1/1970 | Doyle et al. | 260/562 |

*Primary Examiner*—Raymond N. Jones
*Assistant Examiner*—R. A. Yoncoskie
*Attorney, Agent, or Firm*—Bernard & Brown

[57] ABSTRACT

N-Acyl-2,6-dialkyl-p-aminophenols wherein each of the 2,6-alkyl groups has a tertiary α-carbon atom, are used as antioxidants to stabilize edible organic substances subject to deterioration by oxidation, particularly edible fats, fatty oils, fatty alcohols, fatty acids, and esters of fatty acids.

12 Claims, No Drawings

ANTIOXIDANT STABILIZED EDIBLE COMPOSITIONS

This invention relates to the stabilization of edible organic substances subject to deterioration by oxidation.

Various organic compounds and mixtures containing such compounds, including rubber, gasoline, resins, insecticides, soaps, waxes, hormones, vitamins, and fats and fatty oils, are adversely affected by oxidation due to contact with atmospheric oxygen. Desirable features of an antioxidant used to prevent deterioration by oxidation include effectiveness at low concentrations and over a wide range of temperatures, low toxicity, convenient and safe handling, and low cost. Antioxidants are of very great importance in edible fats and fatty oils such as fatty acid glycerides, and in foods made with edible fats and fatty oils. The antioxidants are used to prevent or alleviate oxidative rancidity which causes undesirable flavors and odors, destroys fat-soluble vitamins and essential fatty acids, and produces toxicological effects. A food antioxidant should not impart undesirable characteristics, such as unpleasant odor or discoloration, to the food and advantageously has good carry-through which is the ability to survive baking or frying operations and provide improved keeping quality in food prepared from the stabilized edible organic substance.

Phenols are commonly employed as antioxidants to stabilize organic materials and substituted phenols have been found to have improved antioxidant effectiveness since the efficiency of the phenol group in terminating oxidation is affected by the nature of the ring substituents. Some known phenolic antioxidants are not suitable for use in foods because they are toxic to higher forms of animal life. For example, p-aminophenol is highly toxic and is a skin irritant. Other phenols, such as butylated hydroxytoluene, or BHT, and butylated hydroxyanisole, or BHA, have been employed in food uses after being found to be low or lacking in acute or chronic manifestations of toxic effects in test animals and humans at a level many times greater than that required to provide the antioxidant effect. Young in U.S. Pat. No. 2,654,722 discloses the use of acyl-p-aminophenols to stabilize solid organic materials, such as synthetic rubbers, which tend to deteriorate due to oxidation. The acyl substituent in these antioxidants has at least three carbon atoms and the compounds of this patent can also be employed as food stabilizers.

U.S. Pat. No. 3,492,349 to Doyle and Baxter discloses compounds of the formula

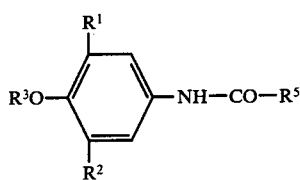

wherein $R^1$ and $R^2$ are the same or different and each is a hydrocarbon group or an alkoxy group having 1 to 6 carbon atoms, $R^3$ is a hydrogen atom or a hydrocarbon group, and $R^5$ is a hydrogen atom or an alkyl group having 1 to 6 carbon atoms. The patent teaches that these compounds have analgesic and antipyretic properties and low toxicity. The compounds of this patent wherein $R^3$ is a hydrocarbon group may not have antioxidant activity since the effectiveness of p-aminophenols and other phenolic antioxidants generally depends upon the presence of a free hydroxyl group, and the ethers and esters of these phenols generally have no significant effect.

It has now been found that certain N-acyl-2,6-dialkyl-p-aminophenols are highly effective antioxidants for use with edible organic substances. In accordance with this invention, edible organic substances subject to deterioration by oxidation are stabilized against oxidation by incorporating therein a minor amount of an N-acyl-2,6-dialkyl-p-aminophenol of the formula

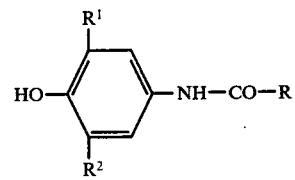

wherein R is a hydrogen atom or an alkyl group having from 1 to about 6 carbon atoms, and $R^1$ and $R^2$ are alkyl groups having from about 4 to 8 carbon atoms, e.g., about 4 to 6 carbon atoms, and a tertiary α-carbon atom, i.e., the carbon atom directly bonded to the ring carbon atom has a tertiary carbon structure. Edible organic substances in the compositions of this invention advantageously include edible fats, fatty oils, fatty alcohols, fatty acids, and esters of fatty acids. The N-acyl-2,6-dialkyl-para-aminophenols have low toxicity and increased or equivalent oxidative stabilization and carry-through compared to prior, commonly employed food antioxidants. The substituted p-amino phenols used in this invention do not impart undesirable odors, flavors, or discolorations to the edible organic substances and, advantageously, are readily soluble therein.

Those compounds of the immediately foregoing structural formula wherein $R_1$ and $R_2$ are alkyl radicals having from about 4 to 8 carbon atoms are especially effective antioxidants. Illustrative examples of compounds which are useful in this invention include those in which the acyl group is derived from formic, acetic, propionic, butyric, valeric, caproic or enanthic acid. Particularly effective and desirable members of the class of compounds employed in this invention are the N-acyl-2,6-di-t-butyl-p-aminophenols, especially the N-acetyl member of this group.

The compounds employed in this invention may be prepared in the manner described in U.S. Pat. No. 3,492,349 to Doyle and Baxter, herein incorporated by reference. In general, this procedure involves the reaction of a 2,6-dialkyl-p-aminophenol of the formula

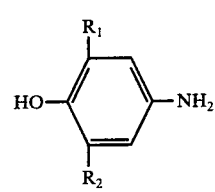

with an acylating agent of the formula RCOX wherein $R_1$, $R_2$, and R are as defined above, and X is a functional group which is active for acylating primary amines such as a halogen atom, or an acyloxy group. The acylating agent may thus be an acyl halide or acid anhydride.

Temperatures of about 0°–50° C. may conveniently be employed in the reaction, and excessive heating and high concentrations or large excesses of acylating agent should generally be avoided in order to acylate the amino group and not the hydroxy group. The 2,6-dialkyl-p-aminophenol starting material may be prepared by nitration or nitrosation of the corresponding 2,6-dialkyl-phenol and reduction of the product by a reducing agent such as hydrosulfide or hydrosulfite. Alternatively, the benzoquinone-4-oxime may be prepared from the corresponding phenol and reduced. The reactions are advantageously conducted in any inert solvent.

The edible organic substances of the compositions of this invention include hydrocarbon-containing substances which are suitable for human or animal consumption. Advantageous edible organic substances are edible fats, fatty alcohols, fatty acids, esters of fatty acids, and fatty oils which may be essentially solid or liquid at room temperature, and may be hydrogenated or unhydrogenated. The oils or fats may be naturally-occurring, such as animal or vegetable fats, or synthetic materials. Exemplary materials are tallow, lard, peanut oil, corn oil, cottonseed oil, olive oil, safflower oil, soybean oil, coconut oil, shortening, cooking oils, salad oils and dressings, mayonaisse, margarine and the like. The fatty acid portion of such materials generally has at least about 12 carbon atoms, say up to about 24 or more carbon atoms per ester site, and the ester portions are frequently glycerides, although the materials may be other types of esters of various mono and polyhydroxy alkyl alcohols. Generally, the ester portions of the molecule have less than about 12 carbon atoms, preferably less than about 6 carbon atoms, e.g., glycerides or other lower alkyl esters.

The N-acyl-2,6-dialkyl-p-aminophenol is provided in the compositions of this invention in a minor amount based on the weight of the edible organic substance, which amount is effective as an antioxidant, i.e., sufficient to stabilize, or retard the deterioration of, the edible organic substance for a significant period, e.g., at least for a time sufficient for the edible organic substance to be stored and used to prepare foods in a normal or acceptable manner. The amount of antioxidant employed is generally any amount which may have a significant stabilizing effect. The amount of the N-acyl-2,6-dialkyl-p-aminophenol present may depend on the desired period of stability of the edible organic substance and the rate of deterioration of the edible organic substance. Thus, increased amounts of N-acyl-2,6-dialkyl-p-aminophenols may be employed when an increased storage life of the edible organic substance before use is desired. Frequently, the N-acyl-2,6-dialkyl-p-aminophenol will be provided in an amount of at least about 0.005 percent, preferably at least about 0.01 percent, by weight based on the weight of the edible organic substance. Concentrations of about 0.1 or more weight percent of the N-acyl-2,6-dialkyl-p-aminophenol based on the edible organic substance are frequently employed in accordance with this invention. At concentrations in excess of about 5 percent by weight based on the weight of the edible organic substance, little benefit in increased stability is generally observed, and often the concentration of the N-acyl-2,6-dialkyl-p-aminophenol is up to about 1 percent.

The presence of the N-acyl-2,6-dialkyl-p-aminophenol usually does not materially affect the manner in which the edible organic substance is formulated or in which it is used to prepare foods. The N-acyl-2,6-dialkyl-p-aminophenol is preferably uniformly admixed in the edible organic substance. The N-acyl-2,6-dialkyl-p-aminophenol may be added at the time of food preparation or it may be intimately premixed with the edible fat or fatty oils to stabilize them prior to food preparation.

It is often convenient to provide an edible fat or fatty oil composition in which the volume of the product can easily be handled, particularly when the composition must be transported for its use in food preparation. On the other hand, this invention is applicable to large food processing plants where large volumes of edible organic substance are stored and used in food preparation. The N-acyl-2,6-dialkyl-p-aminophenol, due to its low toxicity and the low concentrations which can be effectively employed, is especially suitable for stabilization of large volume doughs such as pastry, cake and biscuit premixes such as are used in the baking industry.

A combination of antioxidants is frequently used in edible fats and fatty oils and foods containing them. The compounds of this invention may be utilized in conjunction with other food antioxidants, such as BHA, BHT, and propyl gallate, to obtain desirable combinations of properties of stability and carry-through. They may also be combined with other food additives such as emulsifiers, suspension agents, and colorings to provide the desired qualities in the final food product.

The following examples are given to illustrate this invention and to show tests conducted to determine the antioxidant effect of the compounds of this invention compared to other food antioxidants. All parts and percentages reported are by weight unless otherwise noted.

EXAMPLE I

Five gram samples of bacon grease are tested for oxidation stability in accordance with the method set forth in ASTM Method D 942-50. For dispersion purposes, the ASTM Method was modified by using a Norma Hoffman Oxidation Bomb placed in an agitation system. The results are provided in Table I.

TABLE I

TEST FOR OXIDATION STABILITY ASTM METHOD D 942-50

| Antioxidant | Percentage of Antioxidant[1] | Lbs. Oxygen[2] 100 Hours | 200 Hours |
|---|---|---|---|
| Control | 0.00% | 78 | 84 |
| Ethoxyquin | 0.01% | 9 | 72 |
| BHT | 0.01% | 24 | 70 |
| N-acetyl-2,6-di-t-butyl-p-aminophenol | 0.01% | 9 | 68 |

[1]The percentages are based on the weight of the bacon grease and calculated at 100% purity.
[2]The pressure drop was determined at 100° C.

The test results after 100 hours show that N-acetyl-2,6-di-t-butyl-p-aminophenol is superior to BHT and equal to ethoxyquin in antioxidizing effectiveness in bacon grease. After 200 hours of the test, none of the antioxidants tested proved effective. However, N-acetyl-2,6-di-t-butyl-p-aminophenol proved to be a slightly better antioxidant than ethoxyquin and BHT.

EXAMPLE II

Since the oxidation of edible organic substances is slow at ambient temperatures, even in the absence of antioxidants, accelerated storage stability tests are conducted in a thermo statically controlled oven with gravity convection which is capable of maintaining a temperature of 145° ± 5° F. (62.8 ± 2.8° C.). The test compares the effective carry-through of antioxidants into food products prepared with antioxidant-treated lard. Storage life until rancidity and thus the effect of antioxidants in retarding rancidity is determined by periodic evaluation for organoleptic (odor and flavor) changes.

There 4-ounce wide mouth glass jars with screw caps and coded labels are filled ⅓ to ½ full with a test sample of antioxidant-treated lard and three jars with an untreated lard sample. The jars are placed in the oven in a manner to allow free circulation of the heated air in the closed oven. A trained organoleptic panel of three members evaluates the odors at 24 hour intervals and a sample is removed from the oven when a rancid odor or flavor has been detected by a majority of the panel members. When all of the samples of each antioxidant treated fat is removed from the oven, the average days to rancidity by odor is calculated for each sample. The results are reported in Table II.

TABLE II

| Fat or Oil | Antioxidant Treatment Wt. %[3] | Storage Stability As Days to Develop Rancid Odor At 145° F. |
|---|---|---|
| Lard (Cut from Food Bacon) | None (Control) | 3 |
| | 0.005 BHA | 8 |
| | 0.010 BHA | 21 |
| | 0.020 BHA | 27 |
| | 0.005 BHT | 5 |
| | 0.010 BHT | 10 |
| | 0.020 BHT | 19 |
| | 0.005 Propyl Gallate | 2 |
| | 0.010 Propyl Gallate | 5 |
| | 0.020 Propyl Gallate | 3 |
| | 0.005 Ethoxyquin | 6 |
| | 0.010 Ethoxyquin | 9 |
| | 0.020 Ethoxyquin | 12 |
| | 0.005 N-acetyl-2,6-di-t-butyl-p-aminophenol | 11 |
| | 0.010 N-acetyl-2,6-di-t-butyl-p-aminophenol | 20 |
| | 0.020 N-acetyl-2,6-di-t-butyl-p-aminophenol | 22 |

[3]Based on Weight of Fat or Oil.

The results shown that N-acetyl-2,6-di-t-butyl-p-aminophenol was superior to propyl gallate and ethoxyquin and slightly better than BHT in antioxidant effectiveness at all levels of antioxidant treatment. At a concentration of 0.020 weight percent, BHA was slightly more effective than N-acetyl-2,6-di-t-butyl-p-aminophenol. However, at 0.005 and 0.010 weight percent, N-acetyl-2,6-di-t-butyl-p-aminophenol was about equal to BHA in antioxidant effectiveness.

What is claimed is:

1. A composition of matter normally subject to oxidative deterioration comprising an edible organic substance normally subject to oxidative deterioration selected from the group consisting of edible fats, fatty oils, fatty alcohols, fatty acids, and esters of fatty acids, and a minor amount effective as an antioxidant of an N-acyl-2,6-dialkyl-p-aminophenol of the formula

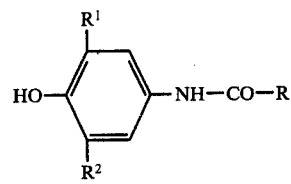

wherein R is hydrogen or an alkyl group having from 1 to about 6 carbon atom and $R_1$ and $R_2$ are alkyl groups having from about 4 to 8 carbon atoms and a tertiary α-carbon atom.

2. The composition of claim 1 wherein $R_1$ and $R_2$ are alkyl groups having from 4 to 6 carbon atoms.

3. The composition of claim 2 wherein R is a methyl group.

4. The composition of claim 3 wherein the N-acyl-2,6-dialkyl-p-aminophenol is N-acetyl-2,6-di-t-butyl-p-aminophenol.

5. The composition of claim 1 wherein the N-acyl-2,6-dialkyl-p-aminophenol is in an amount at least about 0.005 percent by weight of the edible organic substance.

6. The composition of claim 1 wherein the N-acyl-2,6-dialkyl-p-aminophenol is in an amount from about 0.01 to about 1 percent by weight based on the weight of the edible organic substance.

7. The composition of claim 1 wherein the N-acyl-2,6-dialkyl-p-aminophenol is N-acetyl-2,6-di-t-butyl-p-aminophenol.

8. The composition of claim 7 wherein the N-acetyl-2,6-di-t-butyl-p-aminophenol is in an amount from about 0.01 to about 1 percent by weight based on the weight of the edible organic substance.

9. A composition of matter comprising a dough for making bakery products and a minor amount effective as an antioxidant of an N-acyl-2,6-dialkyl-aminophenol of the formula

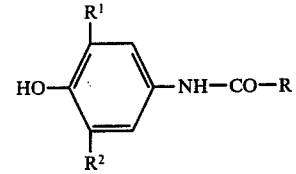

wherein R is hydrogen or an alkyl group having from 1 to about 6 carbon atoms and $R_1$ and $R_2$ are alkyl groups having from about 4 to 8 carbon atoms and a tertiary α-carbon atom.

10. The composition of claim 9 wherein $R_1$ and $R_2$ are alkyl groups having from 4 to 6 carbon atoms.

11. The composition of claim 10 wherein R is a methyl group.

12. The composition of claim 9 wherein the N-acyl-2,6-dialkyl-p-aminophenol is N-acetyl-2,6-di-t-butyl-p-aminophenol.

* * * * *